United States Patent [19]

Nehrkorn

[11] 4,431,116

[45] Feb. 14, 1984

[54] APPARATUS FOR DISPENSING MERCHANDISE FROM A VENDING MACHINE AND VENDING MACHINE COMPRISING THE APPARATUS

[76] Inventor: Rolf Nehrkorn, Weender Strasse 63, 3400 Göttingen, Fed. Rep. of Germany

[21] Appl. No.: 349,962

[22] Filed: Feb. 18, 1982

[30] Foreign Application Priority Data

Feb. 25, 1981 [DE] Fed. Rep. of Germany ....... 3107000

[51] Int. Cl.[3] .............................................. B65G 59/06

[52] U.S. Cl. .................................... 221/121; 221/123

[58] Field of Search ............... 133/5 R; 221/119, 121, 221/122, 132, 95, 123

[56] References Cited

U.S. PATENT DOCUMENTS

| | | | |
|---|---|---|---|
| 3,706,395 | 12/1972 | Havener et al. | 221/119 |
| 4,150,766 | 4/1979 | Westendorf et al. | 221/119 |
| 4,276,894 | 7/1981 | Heywood | 133/5 R |

*Primary Examiner*—H. Grant Skaggs
*Attorney, Agent, or Firm*—Toren, McGeady and Stanger

[57] ABSTRACT

Apparatus for dispensing merchandise from a vending machine comprises an ejector assembly having an ejector, which by a driven eccentric cam is movable to a pile of merchandise and reciprocable under that pile. The apparatus comprises a central, fixed axle (1), which constitutes a stationary element and on which the driven eccentric cam (3, 4) and a bushing (16) are mounted. The bushing can be selectively coupled to the axle (1) and the eccentric cam (3, 4) and carries the ejector assembly (21). The disclike eccentric cam has an eccentric opening (13), which is disposed within the raised cam track. Below the disc (3) provided with the cam track (4), the axle (1) is connected to a bottom plate (2), which has at least one discharge opening (14), with which the opening (13) can be registered and through which merchandise can be discharged at a defined location.

15 Claims, 12 Drawing Figures

Figure 1:
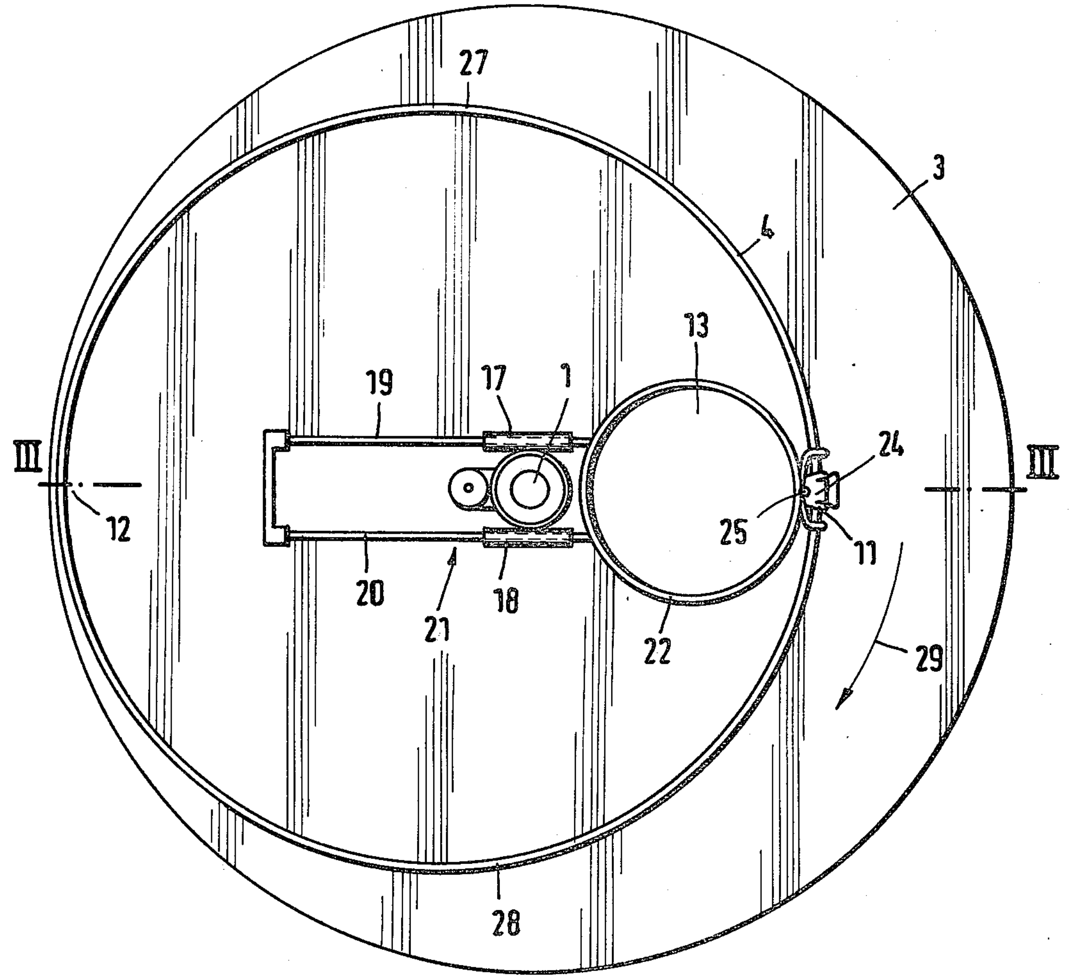

APPARATUS FOR DISPENSING MERCHANDISE FROM A VENDING MACHINE AND VENDING MACHINE COMPRISING THE APPARATUS

This invention relates to apparatus for dispensing merchandise from a vending machine in which piles of merchandise are arranged in a circle. The apparatus comprises an ejector assembly having an ejector which by a driven eccentric cam is movable to a pile of merchandise and reciprocable under said pile, and means for selectively coupling the ejector assembly for joint rotation to the eccentric cam or to a stationary element.

A known apparatus is arranged to centrally dispense each package of merchandise, the outer carrying structure of the apparatus will be complicated and the mounting of a driven disc for the eccentric track will also be complicated. The eccentric track comprises a groove, which is exposed at the top and may become soiled, particularly if flowable solids trickle from defective packages. Whereas the apparatus is mainly intended to dispense cigarette packages, its use for dispensing other merchandise is contemplated too; such merchandise may include portions of flowable solids, such as milk powder, sugar, coffee portions and the like. In that case the piles of merchandise are contained in containers having a rotatable metering discharge device, which is operable by the ejector so that the merchandise may be scattered adjacent to the eccentric track of the proposed apparatus. In the latter, the ejector assembly is mounted on a separate carrier, which is guided on horizontal rails, on which the ejector assembly is guided as it is reciprocated. It is apparent that these guiding means and the required coupling means are structurally expensive and involve a risk of jamming and blocking, particularly when they are soiled, e.g., by flowable solids.

An important criterion of the usefulness of apparatus for dispensing merchandise from a vending machine is its space requirement and the expenditure involved particularly in charging the vending machine. In that connection it will not be desirable to support the piles of merchandise on guiding means in a carrying external housing. Problems are also involved in an eccentric mounting of a rotary disc, particularly if a unilateral loading cannot be avoided.

It is an object of the invention to provide a dispensing apparatus which is of the kind described first hereinbefore and which is distinguished by a simple and particularly compact structure comprising simple supporting and bearing means and is composed of a few parts, which can easily be replaced, and is designed to facilitate the arrangement of the piles of merchandise for their replacement as a whole.

This object is accomplished in accordance with the invention in that an axle for rotatably mounting the eccentric cam is centrally disposed in the apparatus and constitutes a stationary element, on which the eccentric cam and a bushing are mounted, and said bushing is adapted to be selectively coupled alternatively to the axle and to the eccentric cam and carries the ejector assembly. The centrally disposed axle permits a desirable mounting of all parts which rotate about the axle and also permits in a desirable manner a support of piles of merchandise, which are arranged in a circle, on a carrier mounted on the axle. A replacement is required only in an upward direction and there is no need to provide bearings and guiding means which are accessible only with difficulty during the removal and introduction of merchandise. Above all, the space requirement can be reduced in that a non-carrying outer covering is provided rather than a carrying housing. This is significant also regarding the expenditure because the carrying part of the frame may consist of simple section members, which are relatively inexpensive.

Only two rotatable elements are required to be mounted on a stationary axle. One of said elements, namely, the bushing, may be supported with low friction on the eccentric cam. Because the parts to be coupled are concentrated at the center and consist of small, simple components, a particularly desirable coupling may be used, which may be light in weight, just as the components to be coupled.

If the eccentric track for the ejector is provided by a driven disc, the latter will preferably be provided within the eccentric track with an eccentric opening, which is disposed adjacent to that portion of the eccentric track that is nearest to the axle.

Such an eccentric opening is desirable because it permits a handling of merchandise by the disc, which then serves as a distributor for the merchandise. The ejector assembly suitably comprises shifting means, which conform to one unit of merchandise and are disposed above the disc and engage the merchandise which is to be dispensed through the opening. In such an arrangement the disc may be rotated to move the ejector in the ejecting direction and a merchandise package which has fallen on the disc can be held until it falls through the opening. According to a desired further feature the shifting means consist of a confining ring, which has the same diameter as the opening. If the confining ring is disposed closely above the disc and is provided, if desired, with a sealing strip wiping over the disc, flowable solids may be confined in a predetermined area of the disc an may then be fed to the opening.

The eccentric track may preferably consist of a raised rib, which along one semicircle between the points spaced the smallest and largest distances from the axle is higher than in the other semicircle and which serves to control the elevation of the ejector, which consists of a rider that is guided on the rib. In that case the track constitutes a two-dimensional cam, which during a rotation through 360° controls the movement of the ejector and permits also an outward movement of the ejector in a lower position under a pile of merchandise and a subsequent lifting of the ejector and a retraction thereof in engagement with a lowermost package or with an actuation of a discharge device. The raised rib constitutes on the disc a boundary, within which the merchandise is dropped.

The ejector is suitably pivotally linked to the ejector guide, particularly to the shifting means, so that the apparatus can be operated by a small effort. For the same purpose, the ejector assembly is preferably guided on two parallel guiding sleeves carried by the bushing.

In another embodiment, which is particularly preferred, the axle is secured to a bottom plate, which is disposed below the disc provided with the eccentric track and has at least one discharge opening, to which the opening in the disc is movable. In that case the place of ejection will be exactly defined and may be provided at any desired location in front or on the right or left.

One discharge opening will generally be sufficient. If different kinds of merchandise are to be dispensed through different discharge openings, different discharge openings may be selected by means of the disc provided with the eccentric track. This is also possible because the disc provided with the eccentric track has an eccentric opening, which is provided with means for shifting the merchandise. Such means for shifting the merchandise may consist of a depending annular rib on the rim of the opening in the disc. Where a plurality of discharge openings are provided, a gripper, which is adapted to be locked in a closed position, may be provided at the rim of the opening in the disc as means for shifting the merchandise.

In a preferred embodiment, the driven disc has a hub, which is rotatably mounted on the axle, a member which is disposed above the hub and rotates with the latter is rotatably mounted on the axle and arranged to close a circuit in response to its rotation, the hub has profiled locking means, which are aligned with the opening in the disc and adapted to lock the disc in an initial position and the bushing is provided with coupling means for selectively coupling the bushing to the axle and to the disc at the hub thereof.

In a preferred embodiment, a solenoid is mounted on the axle and a movable armature is rotatably and axially movably mounted on the axle and non-rotatably and axially movably mounted on the bushing and is adapted to be connected at one end to the locking means and to be frictionally connected at the other end to the solenoid.

In another embodiment, profiled setting means consisting of axially parallel holes are provided, the profiled locking means of the hub consist of a vertical indentation and the coupling means consist of a solenoid, which is mounted on the bushing and has a rodlike armature, which at one end interengages with the profiled locking means and in response to an energization of the solenoid is lifted out of the locking means and moved into the profiled setting means.

In order to approach a selected pile of merchandise, particularly in conjunction with shift registers known per se and used to control a motor, the axle is provided with a contact switch of a stepping control system and a member which is rotatable relative to the axle, particularly the bushing, is provided with timing projections, which are angularly spaced apart like the piles of merchandise and cooperate with the switch to generate timing pulses during the approach to a pile of merchandise and/or the movement to the initial position. This arrangement results in a very simple control, by which the stepping pulses are counted in the shift register to select a pile of merchandise, and the latter is then approached in that the eccentric track is driven to move the ejector assembly, whereafter the coupling means are shited to lock the ejector assembly to the axle and the disc and the eccentric track is moved through a complete revolution to actuate the ejector. The ejector assembly is then coupled to the disc and the latter is returned to its initial position, in which the opening in the disc overlies the discharge opening. This simple embodiment serves mainly for dispensing packages, such as cigarette packages. But the control system can also be used to select one of several discharge openings in the bottom plate.

Special advantages will be afforded if the central axle constitutes a column for carrying a carrier for piles of merchandise arranged in a circular array in vertical compartments, from which the lowermost package of merchandise can be pushed inwardly, and the outside diameter of that circular array is approximately twice the distance from the axis of the axle to that portion of the eccentric track which has the largest spacing from said axis. A carrier for the merchandise preferably comprises an upper carrying spider, which is inserted, e.g., with a central pin, into an opening at the top of the axle or in a sleeve mounted on the axle. Within the scope of the invention, the inside surface of the opening or sleeve, on the one hand, and the outside surface of the pin, on the other hand, may be provided with mutually complementary projections and recesses which are interengageable to permit the carrier for the merchandise to be inserted only in a predetermined angular position relative to the dispensing apparatus.

Figure 3:
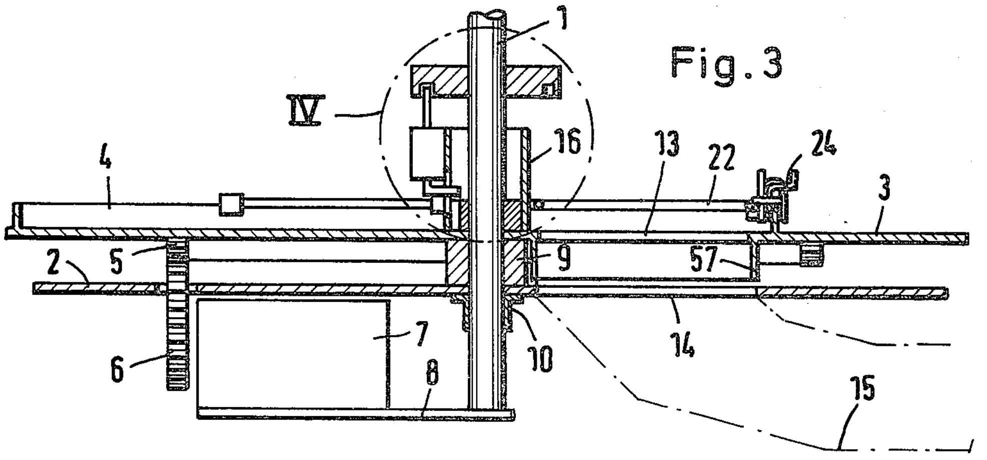
Figure 2:
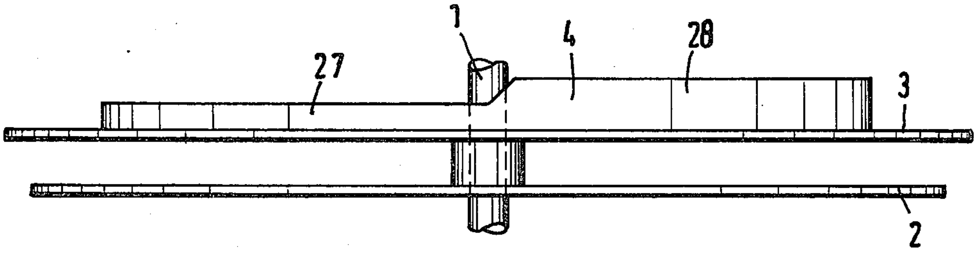
Figure 4:
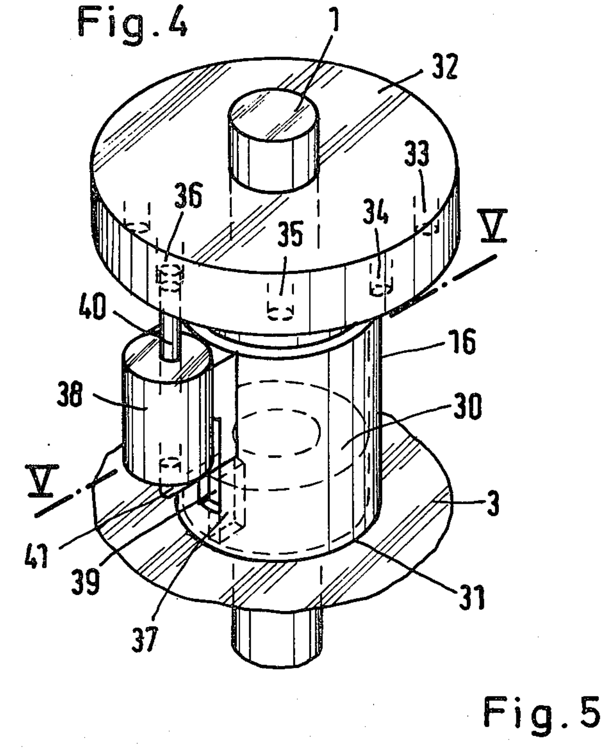

The invention will now be described with reference to illustrative embodiments shown on the accompanying drawings, in which FIG. 1 is a fragmentary top plan view showing part of the apparatus for dispensing merchandise in an initial position, FIG. 2 is a fragmentary side elevation showing the apparatus of FIG. 1 as seen from the left in FIG. 1, FIG. 3 is a sectional view taken on line III—III in FIG. 1, FIG. 4 is an enlarged fragmentary perspective view showing a portion of the apparatus shown in FIGS. 1 and 3.

Figure 5:
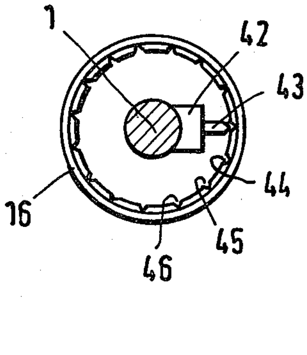
Figure 6:
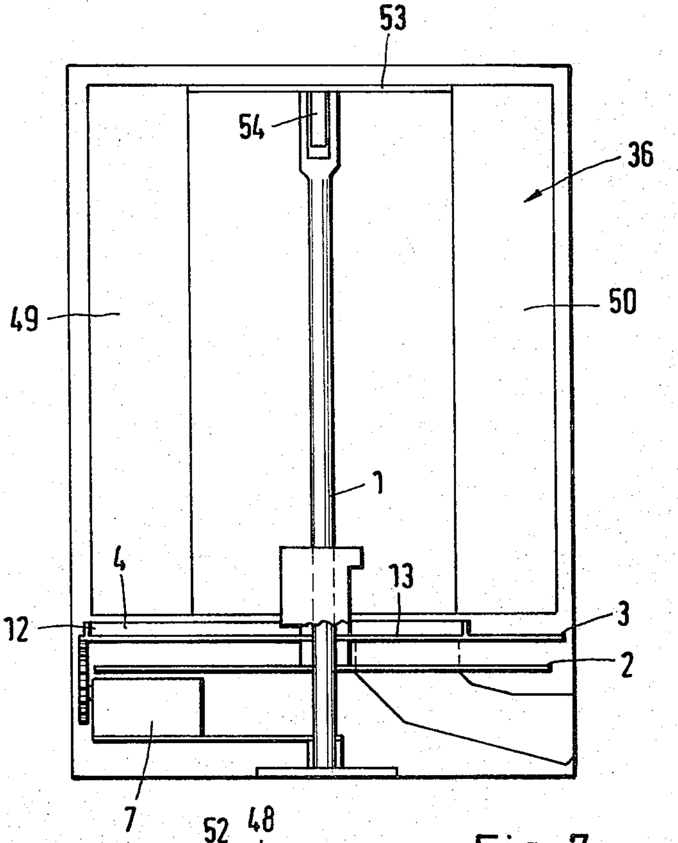
Figure 7:
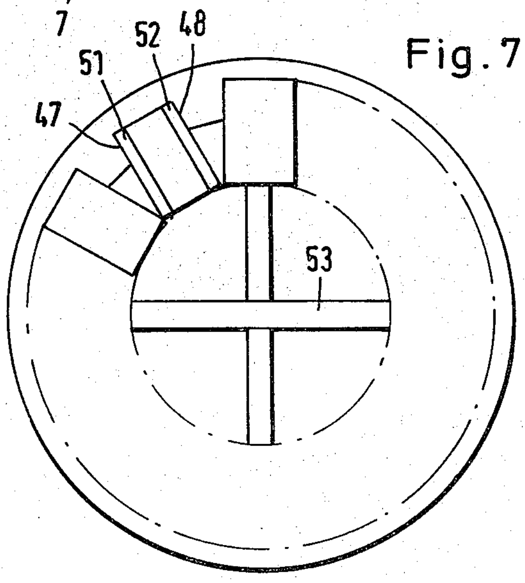
Figure 8:
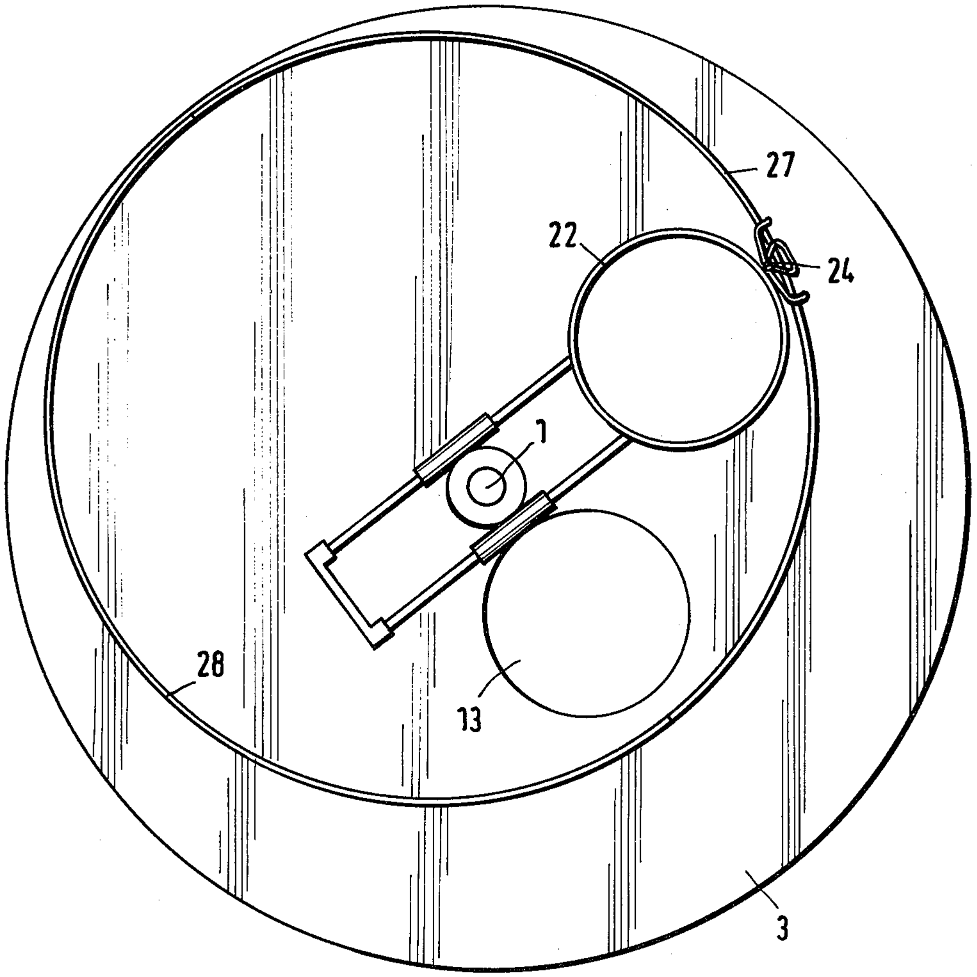
Figure 9:
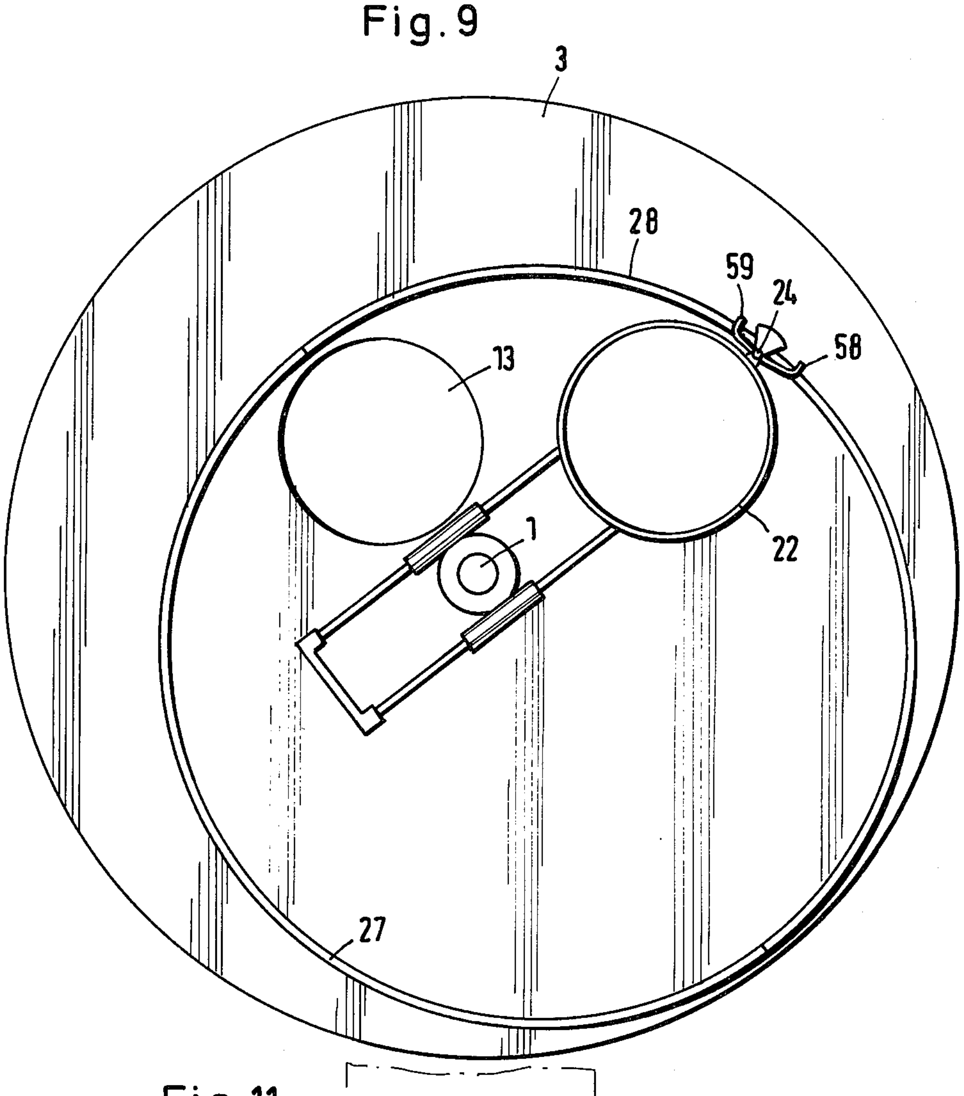
Figure 11:
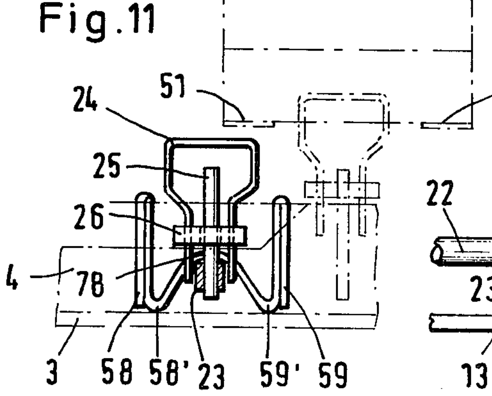
Figure 10:
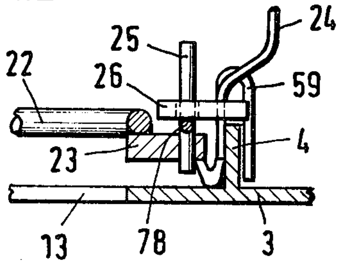
Figure 12:
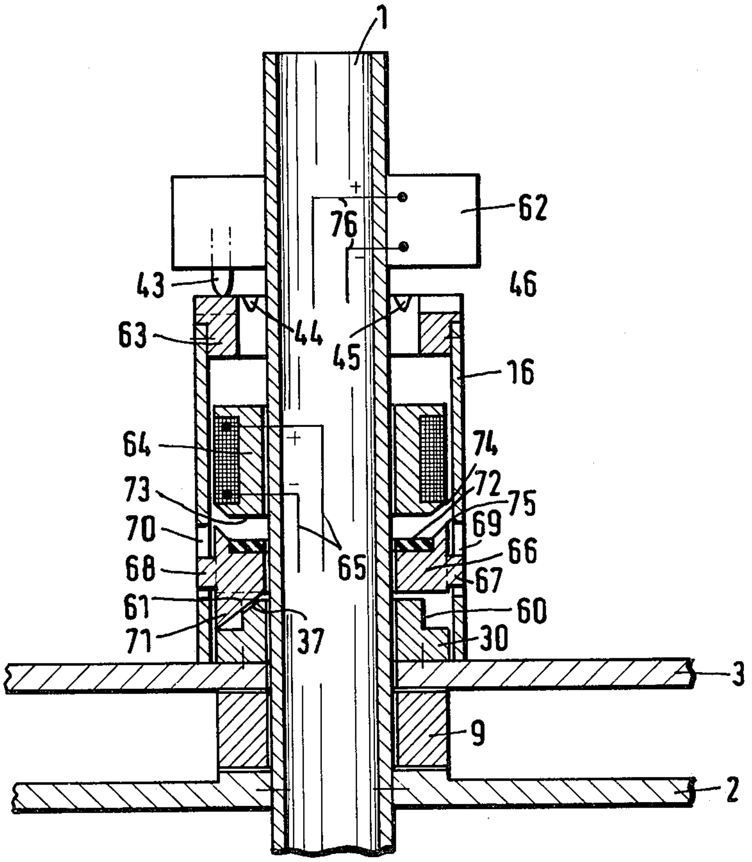

FIG. 5 is a sectional view taken on line V—V in FIG. 4,

FIG. 6 is a side elevation showing the essential parts of a vending machine for an explanation of its design, FIG. 7 is a top plan view of the machine shown in FIG. 6, FIGS. 8 and 9 show the apparatus of FIG. 1 in an intermediate operating position, FIG. 10 is an enlarged fragmentary side elevation, partly in section, showing the ejector arranged on the rib which constitutes the eccentric track, FIG. 11 is a front elevation showing the arrangement of FIG. 10 and FIG. 12 is a diagrammatic vertical sectional view showing a modification of the sub-assembly of FIG. 4.

The basic design of a vending machine is apparent from FIG. 6, which shows how the components are associated with each other. Specifically, a central axle is shown, which is secured to a bottom plate 2 and on which a disc 3 disposed above the bottom plate 2 is rotatably mounted. A bushing 16 is associated with the disc 3 and is guided in a specific manner on the central axle but can be coupled to the disc 3.

In the embodiment shown in FIGS. 1 to 3 a frame of the vending machine is mounted on an underframe or base column and carries a stationary central axle 1, on which a bottom plate 2 is non-rotatably mounted. A disc 3 is rotatably mounted on the axle 1 and spaced above the bottom plate 2 and comprises an eccentric track 4, which consists of a raised rib. A gearmotor 7 is carried by a bracket 8, which is mounted on the central axle 1. The output wheel of the gearmotor 7 extends through an opening in the bottom plate 2 and engages a drive ring 5 provided on the underside of the disc 3. The output wheel and the drive ring are in frictional contact or in toothed mesh. The arrangement is such that the drive ring 5 extends closely outwardly of an opening 13 in the disc 3. For instance, the disc 3 may be supported by means of a spacing sleeve 9, which is rotatably supported on the bottom plate 2. The latter is secured to the central axle by a clamping ring or flange 10.

The track 4 is eccentric to the central axle so that the portion 11 of the track is nearest to the central axle 1 and the diametrically opposite portion 12 of the track is spaced the largest distance from the central axis. The disc 3 has an opening 13, which is disposed between the portion 11 and the central axle 1. In the initial position, shown in FIG. 1, the opening 13 overlies a discharge opening 14, which is formed in the bottom plate 2 and may be succeeded by a discharge chute 15.

It is apparent from FIG. 3 that a ring 57 provided along the lower edge of the opening 13 extends close to the bottom plate 2 and serves to shift the merchandise.

A bushing 16 is mounted on the central axle 1 and is rotatable relative to the latter and to the disc 3. As will be explained more in detail with reference to FIG. 4, the bushing is adapted to be coupled to the disc 3 or to the stationary central axle 1. The bushing 16 is a carrier for or part of an ejector assembly. Two horizontal guide sleeves 17, 18 are secured to the bushing 16 on opposite sides thereof and contain and guide parallel rods 19, 20 of an ejector guide, which is generally designated 21. On the side which faces the portion 11, a confining ring 22 which is equal in diameter to the opening 13 is mounted on the rods 19, 20 and is linked by a pivoted connecting member 23 (FIG. 10) to an ejector 24, which rides on the track 4.

Also in conjunction with FIG. 10 it is apparent that the ejector is pivoted on a pin 25, which in accordance with FIG. 10 extends upwardly through an opening in a guiding plate 26. In FIG. 10 the ejector 24 is shown in its lowermost position on the track 4. In conjunction with FIG. 11 it is apparent that laterally protruding, U-shaped members 58, 59 are provided, which are connected by a crosspiece 78 that is secured to the pin 25 and have upwardly and downwardly extending legs, which extend over the track 4. The lower bights 58', 59' of the members 58, 59 slide on the disc 3. The U-shaped members 58, 59 can extend over the track 4 in two portions differing in height so that the guidance of the ejector 24 on the track 4 is ensured. The crosspiece 78 extends through the pin 25 and is engaged on one side by the connecting member 23, which is secured to the confining ring 22, and on the other side by the guiding plate 26, which extends over the track and constitutes a rider for ensuring a vertical guidance. The pin 25 extends upwardly for such a distance that the guiding plate is pivoted on the pin regardless of the position of the ejector. The pin 25 will rotate under the control of the legs of the members 58, 59, which are guided on the track. The ejector 24 has lower end portions which extend through the guiding plate 26 and ensure that the ejector will be guided also during its pivotal movement about the pin 25, as is apparent, e.g., from FIG. 9.

It is apparent from FIG. 2 that the track 4 consisting of a rib comprises mutually opposite semicircles 27, 28 differing in height on opposite sides of the portions 11, 12. When the disc 3 is driven in the direction of the arrow 29 in FIG. 1 from the initial position shown and the bushing 16 is non-rotatably held on the central axle 1, the ejector 24 moving along the lower semicircle 27 of the track will move outwardly and will reach its outermost position as the portion 12 enters the ejector 24. At the beginning of a continued rotation through 180°, the ejector is raised to the higher semicircle 28 of the track so that the ejector is then on the level of a lowermost package of merchandise. By this movement the disc 3 and track are returned to the initial position, which is shown in FIG. 1 and in which the ejector is in its innermost position and is lowered.

These movements are apparent more clearly from FIGS. 8 and 9. FIG. 8 shows an intermediate position, in which the middle portion of the semicircle 27 is adjacent to the ejector and the opening 13 has moved through a corresponding angle. FIG. 9 shows a position in which a portion of the semicircle 28 is disposed near the ejector 24. The intermediate positions for a reciprocation are thus apparent. As the guiding plate 26 moves to the track portions differing in height, the guiding plate 26 slides on the pin 25 and remains connected to the ejector guide 21 and the confining ring 22.

The region IV in FIG. 3, comprising the bushing 16, will now be explained more fully with reference to FIG. 4.

Only a central portion of the driven disc 3 within the track 4 is shown in FIG. 4 and is provided at its center with a hub 30, which surrounds the axle 1 and forms a rotary bearing. The hub rotates with the disc 3 when the latter is driven. The bushing 16 may be guided on the outside of the hub 30 and is provided at its lower rim 31 with low-friction material. The top end of the bushing 16 is disposed under a flange 32 secured to the fixed axle 1. In the embodiment shown by way of example the flange 32 is larger in diameter than the bushing. It has profiled setting means 33 to 36, which are open at least at the bottom and are aligned with respective piles of merchandise, which are arranged in a circle around the axle 1. These profiled setting means 33 to 36 may also serve as timing means.

The hub 30 has profiled locking means 37, which in accordance with FIG. 4 may consist of a vertical slot. A coupling is provided, which comprises a solenoid 38 provided on the outside of the bushing 16 adjacent to a vertical generatrix, at which the bushing has a slot 39, which extends adjacent to and above the hub 30. The dimensions are so selected that when the solenoid 38 is energized an armature rod 40 of the solenoid enters a hole of the profiled setting means 33 to 36. The armature rod 40 has an angled lower end 41, which normally extends into the slotlike profiled locking means 37 and in response to the energization of the solenoid 38 is moved out of said profiled locking means to a plane disposed above the hub 30. At that time, the bushing 16 and with it the ejector guide 21 is connected to the fixed axle. A continued movement imparted to the disc 3 will then cause an unslotted portion of the sleeve 30 to register with the angled portion 41 so that the solenoid 38 may now be de-energized and the angled portion 41 will then ride on the top of the hub and after a rotation through 360° will drop back into the profiled locking means 37 so that the bushing 16 is uncoupled from the fixed axle 1 and coupled to the disc 3.

The operating position in which the bushing 16 is connected to the flange 32 during different steps will be described with reference to FIGS. 1, 8 and 9. These steps virtually constitute the second cyclic part of the operation by which the ejector is reciprocated.

When a pile of merchandise has been selected, e.g., by the selection of an associated shift register included in the control system, the gearmotor 7 is energized whereas the solenoid 38 is not yet energized. The disc 3 is then rotated so that the ejector 24 then fixed to the track 4 is carried along to a position until it registers with the selected pile of merchandise. Depending on the pile of merchandise which has been selected by means of the shift register, stepping pulses are delivered to the control system in response to the rotation of the ejector guide 21 and the bushing 16 and are processed in the shift register so that the gearmotor 7 is de-energized and the solenoid 38 is energized when the ejector has reached the desired position. The gearmotor 7 is thereafter re-energized so that the track 4 is rotated to impart to the ejector the movement which has been described before. For this purpose the control system causes the disc 3 to rotate through 360°. No stepping pulses are generated during this rotation, which may be defined by stop means, if desired. After the rotation through 360° for reciprocating the ejector has been performed, the angled end portion 41 drops automatically into the profiled locking means 37 so that the bushing 16 and the ejector, which is in its innermost position, will now be carried along once more by the disc 3 and the first rotation serving to approach the selected pile of merchandise will be resumed and continued until a rotation of 360° has been performed so that the opening 13 overlies the discharge opening 14.

The stepping pulses can be generated in a simple manner by a contact switch 42, which is mounted on the fixed axle 1 and has a radially outwardly extending actuating element 43. Profiled timing means, such as indentations 44 to 46 associated with respective piles of merchandise, are provided on the inside of the bushing 16 and cooperate with the actuating element 43. This arrangement constitutes a particularly simple control subassembly comprising simple but reliable interengaging means. The holes which constitute the profiled timing means have such a vertical depth that the angled portion 41 will be reliably lifted out of the slot 37 first in response to the de-energization of the solenoid 38.

FIGS. 6 and 7 show the relative arrangement of a carrier for the merchandise. In the side elevation those of the main components which are described are shown with the disc 3 in the initial position of FIG. 1 so that the portion 12 of the track 4 is disposed on the left at the outer periphery of the arrangement. Two piles of merchandise 49, 50, for instance, are apparent, which have side brackets 47, 48, which extend on opposite sides of a pile of merchandise and have flanges 51, 52, which extend toward each other and under the lowermost package. An ejector 24 is movable between the flanges 51, 52. The side brackets 47, 48 are interconnected at their middle or upper portions and are suspended at their top ends from a carrying spider 53, from which they may be detachable, if desired. The top ends of the pile holders are interconnected, e.g., at their inner edge.

The carrying spider is provided with a centrally disposed, depending pin 54, which is non-circular and adapted to be inserted into an open-topped, mating non-circular opening 55 in a predetermined relative angular position to ensure the alignment with the profiled setting means 33 to 36 and the timing projections 44 to 46. The cylindrical carrier for merchandise is generally designated 56 and can be removed and installed as a unit. It is apparent that it is sufficient to provide a thin covering outside the piles of merchandise. That covering suitably has windows and is secured, e.g., also to the carrier 56 for merchandise and extends downwardly beyond the bottom plate 2 and the gearmotor 7.

Essential elements of the control system are shown and described herein. It will be understood that selecting pushbuttons or selector switches which are accessible from one side of the control system may be carried by a bracket which is similar to the bracket 8 in FIG. 3. A control system comprising shift registers is known per se. In the present case only the elements shown in combination with the vending machine are significant because they permit the design of a simple control system.

FIG. 12 shows a modification of the sub-assembly of FIG. 4. The central axle 1 is tubular and has secured to it the bottom plate 2, which is fixed like the central axis 1 and carries the spacing sleeve 9, which constitutes also a bearing and on which the driven cam disc 3 is rotatably mounted. That disc is non-rotatably connected to the hub 30, which in the embodiment shown in FIG. 12 has an open-topped step 60 and is provided at a corner 61 in the upper portion of the step with profiled locking means 37, which consist of a slot. The bushing 16 is freely rotatably mounted on the outside of the hub 30.

A microswitch 62, which corresponds to the flange 32 in FIG. 4, is non-rotatably connected to the axle 1 and protrudes at least on one side. That microswitch 62 has the same function as the contact switch 41 in FIG. 4 and comprises an actuating element 43, which is coaxial to the axle 1 in FIG. 12.

Below the microswitch 62, an end ring 63 mounted on the top end of the busing 16 comprises angularly spaced apart timing openings 44 to 46 consisting of slotlike radial notches, which cooperate with the actuator for the generation of stepping pulses when the bushing 16 is rotated relative to the microswitch 62.

In the embodiment shown in FIG. 12, a solenoid 64 which corresponds to the solenoid 38 in FIG. 4 is non-rotatably secured to the axle 1 and is connected by leads 65 to a control signal generator. An armature 66 which is movable between the axle 1 and the bushing 16 is associated with the solenoid 64 and constitutes a locking member. That armature comprises radially outwardly extending projections 67, 68, which can be moved into axial slots 69, 70, which are formed in the bushing in the range of movement of the armature. As a result, the armature is vertically movable and rotatable relative to the axle 1 but is only vertically movable relative to the bushing 16. On its underside, the armature 66 has a lug 71, which is triangular in side elevation and increases in height in a radially outward direction and interengages with the profiled locking means 37 when the lug 71 is in register therewith so that the bushing 16 is non-rotatably coupled to the disc 3 at the hub 30 in this position, which is shown on the drawing.

The armature 66 is provided at the top with a friction covering 72 of rubber, e.g., soft rubber, or another suitable material. In response to its energization, the solenoid 64 attracts the armature 66 and thus disengages it from the hub 30 whereas a frictional connection to the solenoid 64 is established on the underside 73 of the latter; that underside is formed by a friction disc. As a result, the bushing is non-rotatably connected to the axle 1.

Conical beveled surfaces 74, 75 for centering may be provided on the underside of the solenoid 64 and on the outside of the armature 66.

The condition resulting from the shifting of the coupling of the bushing 16 has already been described with reference to FIG. 4. In FIG. 12 the leads 76 connected to the microswitch 62 are shown too. It is apparent that the leads 76 and 65 may extend through the tubular axle so that the connections will be simpler than in the embodiment shown in FIG. 4, where the solenoid 38 rotates with the bushing so that a connection comprising slip rings is required.

When the armature 66 has been lifted from the hub 30 and the rotation of the disc 3 is continued, the de-energization of the solenoid 64 will initiate the same operation as in FIG. 4. The edge of the lug 71 slides with low friction on the corner 61 during a rotation of the bushing 16 until the lug 71 falls back into the profiled locking means 37.

Particularly the embodiment described last, in which a frictional connection is established, permits the operations comprising switch actuations and the shifting of the coupling to be performed in a continuous sequence whereas the drive motor is energized continuously, from the initial position to the return to the latter. This can be accomplished also in the embodiment shown in FIG. 4 if the parts are properly matched. The embodiment shown in FIG. 12 can be operated at higher speed. The frictional connection ensures a sufficiently exact adjustment of the components relative to each other.

The association of and connections between the parts have been described hereinbefore. Fixed connections may be made by screwing, riveting or welding; this has been symbolically indicated in part. Where a bearing has been disclosed, anti-friction means, not shown, may be provided between the parts which are movable relative to each other; such means may comprise rolling element bearings. A frictional contact is established by a force-transmitting engagement of friction surfaces, as is known from friction gearings. The reference to a toothed mesh indicates that the meshing parts, such as the parts 5 and 6 in FIG. 3, are provided with meshing teeth.

What is claimed is:

1. Apparatus for dispensing merchandise from a piles of merchandise in which said piles of merchandise are arranged in a circle, which apparatus comprises, in combination, a centrally disposed, stationary axle, a disc rotatably mounted on said axle and adapted to extend under said piles of merchandise in said vending machine and having a track which is eccentric with respect to said axle, an ejector assembly which is rotatably mounted on and extends radially from said axle over said disc and is carried by said disc and adapted to extend below said piles of merchandise and comprises an ejector, which is reciprocable along said ejector assembly under each of said piles of merchandise and operatively connected to said track, and coupling means for selectively coupling said ejector assembly to said axle so that said disc is rotatable relative to said ejector assembly, and for selectively coupling said ejector assembly to said disc so that said ejector assembly is adapted to be moved into alignment with a selected one of said piles of merchandise by a rotation of said disc, said track being arranged to reciprocate said ejector along said ejector assembly in response to a rotation of said disc relative to said ejector assembly and having two peripheral portions which differ in height and are arranged to control the elevation of said ejector, one of said portions being adapted to support said ejector so that it is movable under each of said piles of merchandise, the other of said portions being adapted to support the ejector so that it is engageable with the lowermost portion of each of said piles of merchandise, said track having two transitional portions connecting said two peripheral portions.

2. Apparatus as set forth in claim 1, wherein two rotatable elements are rotatably mounted on said axle and one of said elements is supported by and in low-friction contact with the other.

3. Apparatus as set forth in claim 1, wherein said track comprises a rib rising from said disc, each of said two peripheral portions together with one of said transitional portions consists of a semicircle, one of said transitional portions is that portion of said track which is nearest to said axle, the other of said transitional portions is that portion of said track which is most remote from said axle, two parallel guide sleeves are non-rotatably connected to said bushing, said ejector assembly comprises an ejector guide, which is guided by said guide sleeves to be radially movable relative to said bushing, and said ejector is mounted on said ejector guide to be vertically movable relative thereto.

4. Apparatus as set forth in claim 3, wherein said ejector assembly comprises a vertically movable pin, which is rotatably mounted in said ejector guide, a plate which is mounted on and vertically movable relative to said pin and secured to said ejector, and two U-shaped members, which are secured to said pin and protrude from opposite sides of said pin and have upwardly and downwardly bent legs, which embrace said track.

5. Apparatus as set forth in claim 1, wherein a bushing is rotatably mounted on said axle, said ejector assembly is non-rotatably connected to said bushing, said coupling means are adapted to selectively couple said bushing to said axle and to said disc, said track has a peripheral portion which is nearest to said axle, said disc is formed inside said track with an opening which is aligned with said peripheral portion which is nearest to said axle, and said ejector assembly comprises confining means adapted to receive merchandise removed by said ejector from any of said piles by a reciprocation of said ejector and to shift said merchandise on said disc to said opening in response to a rotation of said disc relative to said ejector assembly.

6. Apparatus as set forth in claim 5, wherein said opening has substantially the same configuration as the cross-section of each of said piles of merchandise, and said confining means comprise a ring, which has substantially the same inside configuration as the cross-section of each of said piles of merchandise.

7. Apparatus set forth in claim 5, wherein a bottom plate is disposed under said disc and secured to said axle and is formed with a discharge opening, said opening in said disc is adapted to register with said discharge opening in response to a rotation of said disc, and said disc comprises shifting means surrounding said opening in said disc near the rim of said opening.

8. Apparatus set forth in claim 5, wherein said disc has a hub which is rotatably mounted on said axle.

switching means for controlling said drive means are non-rotatably mounted on said axle above said hub, switch-actuating means are provided for actuating said switching means in response to the rotation of said bushing about said axle, said hub has profiled locking means which are aligned with said opening in said disc, and said coupling means comprise means for non-rotatably connecting said bushing to said profiled locking means.

9. Apparatus as set forth in claim 8, wherein profiled setting means are non-rotatably connected to said axle and comprise a plurality of angularly spaced apart holes, which are axially parallel to said axle, said profiled locking means consist of a vertical indentation in said hub, said coupling means comprise a solenoid, which is non-rotatably connected to said bushing, and a rodlike armature which is arranged to interengage with said profiled locking means when said solenoid is de-energized and to disengage said profiled locking means and interengage with said profiled setting means in response to an energization of said solenoid, said switch-actuating means comprise timing projections carried by said bushing and having a regular angular spacing, and arranged to actuate said switch so that the latter generates a stepping pulse in at least one predetermined angular position of said ejector assembly relative to said disc.

10. Apparatus set forth in claim 8, wherein switching means for controlling said drive means are provided, and a flange is secured to said axle and comprises angularly spaced apart, profiled setting means, which are associated with respective piles of merchandise and adapted to operate said switching means.

11. Apparatus according to claim 8, wherein said coupling means comprise a coupling member secured to said axle, a solenoid, which is secured to said axle, an armature, which is mounted on said axle between said profiled locking means and said coupling element and is rotatable and axially movable relative to said axle and non-rotatably connected to said bushing and axially movable relative thereto and arranged to be attracted by said solenoid when the latter is energized, and said armature is disposed between said profiled locking means and said coupling member and comprises a lug, which is arranged to interengage with said profiled locking means when said solenoid is de-energized, and said armature is arranged to be disengaged from said profiled locking means and to be non-rotatably coupled to said coupling member in response to an energization of said solenoid.

12. Apparatus as set forth in claim 11, wherein said solenoid concentrically surrounds said axle, said switching means comprise a microswitch, said bushing carries an end ring adjacent to said switching means, and said switch-actuating means comprise timing openings formed in said end ring, and said axle is tubular and accommodates electric leads connected to said solenoid and microswitch.

13. Apparatus as set forth in claim 8, wherein said bushing accommodates and carries control and coupling elements.

14. A vending machine in which piles of merchandise are arranged in a circle and which comprises apparatus for dispensing merchandise from said piles, which apparatus comprises, in combination, a centrally disposed, stationary axle, a disc rotatably mounted on said axle and extending under said piles of merchandise in said vending machine and having a track which is eccentric with respect to said axle, an ejector assembly which is rotatably mounted on and extends radially from said axle over said disc and is carried by said disc and adapted to extend below said piles of merchandise and comprises an ejector, which is reciprocable along said ejector assembly under each of said piles of merchandise and operatively connected to said track, and coupling means for selectively coupling said ejector assembly to said axle so that said disc is rotatable relative to said ejector assembly, and for selectively coupling said ejector assembly to said disc so that said ejector assembly is adapted to be moved into alignment with a selected one of said piles of merchandise by a rotation of said disc, said track being arranged to reciprocate said ejector along said ejector assembly in response to a rotation of said disc relative to said ejector assembly and having two peripheral portions which differ in height and are arranged to control the elevation of said ejector, one of said portions being adapted to support said ejector so that it is movable under each of said piles of merchandise, the other of said portions being adapted to support said ejector so that it is engageable with the lowermost portion of each of said piles of merchandise, said track having two transitional portions connecting said two peripheral portions, said machine also comprising a carrier for carrying said piles of merchandise, which carrier is carried by said axle.

15. Apparatus as set forth in claim 14, wherein said axle has at its top an open-topped opening, which is non-circular in cross-section, and said carrier comprises a top spider, which has a central pin, which conforms in cross-section to and is slidably fitted in said opening.

* * * * *